US012639862B2

(12) United States Patent
Kahn et al.

(10) Patent No.: US 12,639,862 B2
(45) Date of Patent: May 26, 2026

(54) VISUALIZATION OF A DRIVING SCENE OVERLAID WITH PREDICTIONS

(71) Applicant: GM Cruise Holdings LLC, San Francisco, CA (US)

(72) Inventors: Adam Kahn, Sebastopol, CA (US); Eric Eakin, Capitola, CA (US); Christopher Hasson, San Francisco, CA (US); David Winegar, Chicago, IL (US); Stuart John Alexander Knightley, Truckee, CA (US); Matthew Tescher, Alameda, CA (US); Bruce Liu, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 162 days.

(21) Appl. No.: 18/403,018

(22) Filed: Jan. 3, 2024

(65) Prior Publication Data

US 2025/0218055 A1     Jul. 3, 2025

(51) Int. Cl.
    *G06T 11/00*      (2026.01)
    *G01C 21/36*      (2006.01)
    G06F 3/04847    (2022.01)

(52) U.S. Cl.
    CPC .......... *G06T 11/00* (2013.01); *G01C 21/3667* (2013.01); *G06F 3/04847* (2013.01); *G06T 2200/24* (2013.01)

(58) Field of Classification Search
    CPC ....................................................... G06T 11/00
    USPC ......................................................... 715/765
    See application file for complete search history.

(56) References Cited

U.S. PATENT DOCUMENTS

| | | | | |
|---|---|---|---|---|
| 9,088,737 | B2 * | 7/2015 | Hahn ...................... | H04N 23/20 |
| 11,427,195 | B1 * | 8/2022 | Pertsel .................. | B60W 30/09 |
| 11,488,393 | B2 * | 11/2022 | May ...................... | G06V 20/584 |
| 11,676,346 | B2 * | 6/2023 | Chang ................... | G06T 19/006 |
| | | | | 340/989 |
| 11,977,603 | B1 * | 5/2024 | Lindgren ............... | G06N 20/00 |
| 2008/0021632 | A1 * | 1/2008 | Amano ........... | G08G 1/096827 |
| | | | | 701/117 |
| 2013/0046441 | A1 * | 2/2013 | Marczok .............. | G05D 1/0212 |
| | | | | 701/41 |
| 2016/0162747 | A1 * | 6/2016 | Singh ..................... | G06V 10/22 |
| | | | | 348/148 |
| 2018/0050695 | A1 * | 2/2018 | Sundaram ............. | B60W 50/06 |
| 2018/0052469 | A1 * | 2/2018 | Sundaram ............. | B60W 10/10 |
| 2018/0052470 | A1 * | 2/2018 | Kim ...................... | B60W 10/04 |
| 2019/0042859 | A1 * | 2/2019 | Schubert ............. | G05D 1/0027 |
| 2019/0051041 | A1 * | 2/2019 | Mills ................... | H04N 9/3185 |
| 2019/0217858 | A1 * | 7/2019 | Nath ................... | G05D 1/0246 |

(Continued)

*Primary Examiner* — Reza Nabi
(74) *Attorney, Agent, or Firm* — Honigman LLP; Matthew H. Szalach; Jonathan P. O'Brien

(57) ABSTRACT

Systems and techniques are provided for visualizing a driving scene overlaid with predictions. An example process includes receiving sensor data collected by one or more sensors of an autonomous vehicle (AV) navigating in a scene, receiving at least one prediction associated with one or more objects in the scene, and generating a superimposed visualization representing the AV in the scene and representing the at least one prediction associated with the one or more objects in the scene. The superimposed visualization may dynamically display the at least one prediction associated with the one or more objects in time sequence as the AV navigates in the scene.

20 Claims, 5 Drawing Sheets

(56) References Cited

U.S. PATENT DOCUMENTS

| | | | | |
|---|---|---|---|---|
| 2019/0265703 A1* | 8/2019 | Hicok | ................. | G01C 21/3438 |
| 2020/0090425 A1* | 3/2020 | Senft-Grupp | ...... | G01R 31/3648 |
| 2020/0348667 A1* | 11/2020 | Gao | .................... | B60W 50/082 |
| 2021/0142687 A1* | 5/2021 | Drakoulis | ................ | G09B 5/00 |
| 2021/0284240 A1* | 9/2021 | Goodarzi | ........... | G06F 3/04847 |
| 2021/0372809 A1* | 12/2021 | Warner | ................. | B60K 35/81 |
| 2022/0167121 A1* | 5/2022 | Vassilyev | ................ | G01S 19/40 |
| 2022/0414492 A1* | 12/2022 | Jezewski | ................. | G06N 5/04 |
| 2023/0001984 A1* | 1/2023 | Lu | ............................ | B62D 1/22 |
| 2023/0020415 A1* | 1/2023 | Sawa | .................. | B60W 50/029 |
| 2023/0157757 A1* | 5/2023 | Braido | .................. | G16H 20/40 |
| | | | | 345/419 |
| 2023/0157762 A1* | 5/2023 | Braido | .................. | A61B 34/37 |
| | | | | 600/424 |
| 2023/0394771 A1* | 12/2023 | Bilinski | ................... | G06T 7/70 |
| 2024/0037961 A1* | 2/2024 | Kaku | ....................... | G06T 7/11 |
| 2024/0096137 A1* | 3/2024 | Takahashi | ............. | B60K 35/22 |
| 2024/0181637 A1* | 6/2024 | Gillett | ..................... | B25J 17/00 |
| 2024/0210186 A1* | 6/2024 | Akashi | ................. | B66F 9/0755 |
| 2024/0219902 A1* | 7/2024 | Maniatopoulos | .... | G05D 1/2246 |
| 2024/0221294 A1* | 7/2024 | Fei | .......................... | G06T 15/60 |
| 2024/0242507 A1* | 7/2024 | Sidhu | ..................... | G06V 20/58 |
| 2024/0317250 A1* | 9/2024 | Chilton | ............. | B60W 60/0011 |
| 2024/0317252 A1* | 9/2024 | Chilton | ................. | B60K 35/00 |
| 2024/0336139 A1* | 10/2024 | Stroebel | ................ | B60K 35/22 |
| 2024/0377206 A1* | 11/2024 | Provenzano | ....... | G01C 21/3415 |
| 2024/0416962 A1* | 12/2024 | Terechko | .......... | B60W 50/0205 |
| 2025/0029488 A1* | 1/2025 | Zahid | .................. | H04W 64/003 |
| 2025/0042294 A1* | 2/2025 | Balasubramanian | ........................ | |
| | | | | G01C 21/3697 |
| 2025/0138719 A1* | 5/2025 | Shioguchi | .......... | G01C 21/3664 |
| 2025/0194455 A1* | 6/2025 | Di Cecilia | ............. | G01S 13/89 |
| 2025/0218055 A1* | 7/2025 | Kahn | ..................... | G06T 11/00 |

* cited by examiner

400

RECEIVE SENSOR DATA COLLECTED BY ONE OR MORE SENSORS OF AN AUTONOMOUS VEHICLE (AV) NAVIGATING IN A SCENE ~410

RECEIVE AT LEAST ONE PREDICTION ASSOCIATED WITH ONE OR MORE OBJECTS IN THE SCENE ~420

GENERATE A SUPERIMPOSED VISUALIZATION REPRESENTING THE AV IN THE SCENE AND REPRESENTING THE AT LEAST ONE PREDICTION ASSOCIATED WITH THE ONE OR MORE OBJECTS IN THE SCENE ~430

VISUALIZATION OF A DRIVING SCENE OVERLAID WITH PREDICTIONS

BACKGROUND

1. Technical Field

The present disclosure generally relates to autonomous vehicles. For example, aspects of the present disclosure relate to techniques and systems for providing a visualization of an autonomous vehicle driving scene overlaid with predictions.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
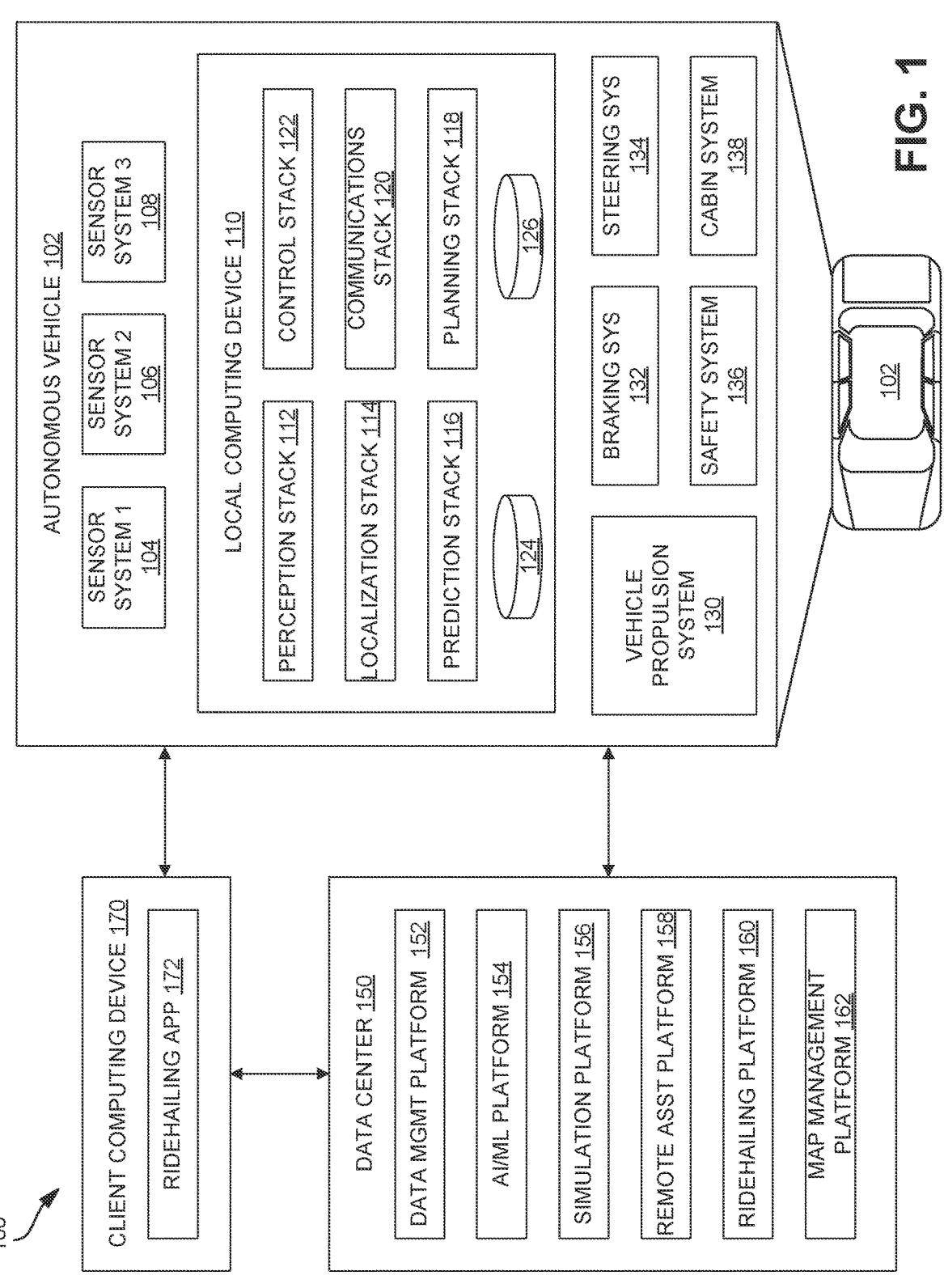
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

As previously described, autonomous vehicles (AVs), also known as self-driving cars, driverless vehicles, and robotic vehicles, are vehicles that use sensors to sense the environment and move without human input. For example, AVs can include sensors such as a camera sensor, a LIDAR sensor, and/or a RADAR sensor, amongst others, which the AVs can use to collect data and measurements that are used for various AV operations. The sensors can provide the data and measurements to an internal computing system of the AV, which can use the data and measurements to control mechanical systems of the AV, such as a vehicle propulsion system, a braking system, and/or a steering system, etc.

Further, data from multiple AV sensors can be combined and fused together to create a visual representation of the environment. That is, a visual map of the surrounding environment can be created, which includes a representation of the terrain, road, and other static and dynamic objects in the environment in which the AV operates. Such visualization of the surrounding environment can be displayed within a user interface to allow a user or a passenger of the vehicle to receive information relating to the environment to better understand the driving scene and the behaviors of the AV.

The data visualization of a driving scene is crucial for accountability and safety in AV operations as it can provide real-time insights into the vehicle's perception of its surroundings, its decision-making process, and its interactions with the environment. Also, being able to see what or how the actors (e.g., static or dynamic objects) in the scene are predicted to behave or affect the navigation and/or operation of the AV can help understand the relationships and interactions between the AV and the other actors in the scene. However, multiple sources of data/information (e.g., real time perception data, prediction data, etc.) could be difficult to comprehend by a user when they are presented in multiple frames or viewports.

Systems, apparatuses, processes (also referred to as methods), and computer-readable media (collectively referred to as "systems and techniques" or "system") are described herein for providing a visualization of an AV driving scene overlaid with predictions. For example, the systems and techniques can generate a superimposed visualization that comprises one layer that depicts the surrounding environment of an AV in real time, which is overlaid with a prediction layer of the same scene that includes predicted behaviors or paths of other actors/objects in the scene.

In some cases, the systems and techniques can provide the superimposed visualization for display within an interactive user interface (UI) where a user can control the timing of the overall scene. For example, a UI can include the superimposed visualization with a time slider and/or a scrubber such that a user is allowed to control the playback position. For example, a user may change a current playback position (e.g., at time t) by moving or sliding a scrubber (e.g., an indicator, a pointer, etc.) along the time slider bar to a new playback position (e.g., at time t+x) to look into future predictions. In another example, a user may replay what has happened in the past in the scene by moving or sliding a scrubber from a current playback position (e.g., at time t) to a new playback position (e.g., at time t−x).

The systems and techniques can generate a visualization within a single frame that displays the state or status of a scene in real time. In some aspects, the visualization can also display one or more predictions associated with actors in the scene (e.g., what the AV thinks is going to happen in the scene). In some examples, the visualization can also display a future status of the scene (e.g., what may end up happening in the scene). Such visualization can provide a comprehensive visualization that integrates multiple layers of information about the scene.

Various examples of the systems and techniques for generating a visualization of a driving scene overlaid with predictions are illustrated in FIG. 1 through FIG. 5 and described below.

FIG. 1 is a diagram illustrating an example autonomous vehicle (AV) environment 100, according to some examples of the present disclosure. One of ordinary skill in the art will understand that, for AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

Prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

Planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

Control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

Communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

Data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ride-hailing service (e.g., a ridesharing service), a delivery service, a remote/ roadside assistance service, street services (e.g., street mapping, street patrol, street cleaning, street metering, parking reservation, etc.), and the like.

Data center 150 can send and receive various signals to and from the AV 102 and the client computing device 170. These signals can include sensor data captured by the sensor systems 104-108, roadside assistance requests, software updates, ride-hailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ride-hailing platform 160, and a map management platform 162, among other systems.

Data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ride-hailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

Simulation platform 156 can enable testing and validation of the algorithms, machine learning models, neural networks, and other development efforts for the AV 102, the remote assistance platform 158, the ride-hailing platform 160, the map management platform 162, and other platforms and systems. Simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

Ride-hailing platform 160 can interact with a customer of a ride-hailing service via a ride-hailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 172. The client computing device 170 can be a customer's mobile computing device or a computing device integrated with the AV 102 (e.g., the local computing device 110). The ride-hailing platform 160 can receive requests to pick up or drop off from the ride-hailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ride-hailing platform 160 may incorporate the map viewing services into the ride-hailing application 172 (e.g., client application) to enable passengers to view the AV 102 in transit en route to a pick-up or drop-off location, and so on.

While the AV 102, the local computing device 110, and the AV environment 100 are shown to include certain systems and components, one of ordinary skill will appreciate that the AV 102, the local computing device 110, and/or the AV environment 100 can include more or fewer systems and/or components than those shown in FIG. 1. For example, the AV 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 5.

Figure 2:
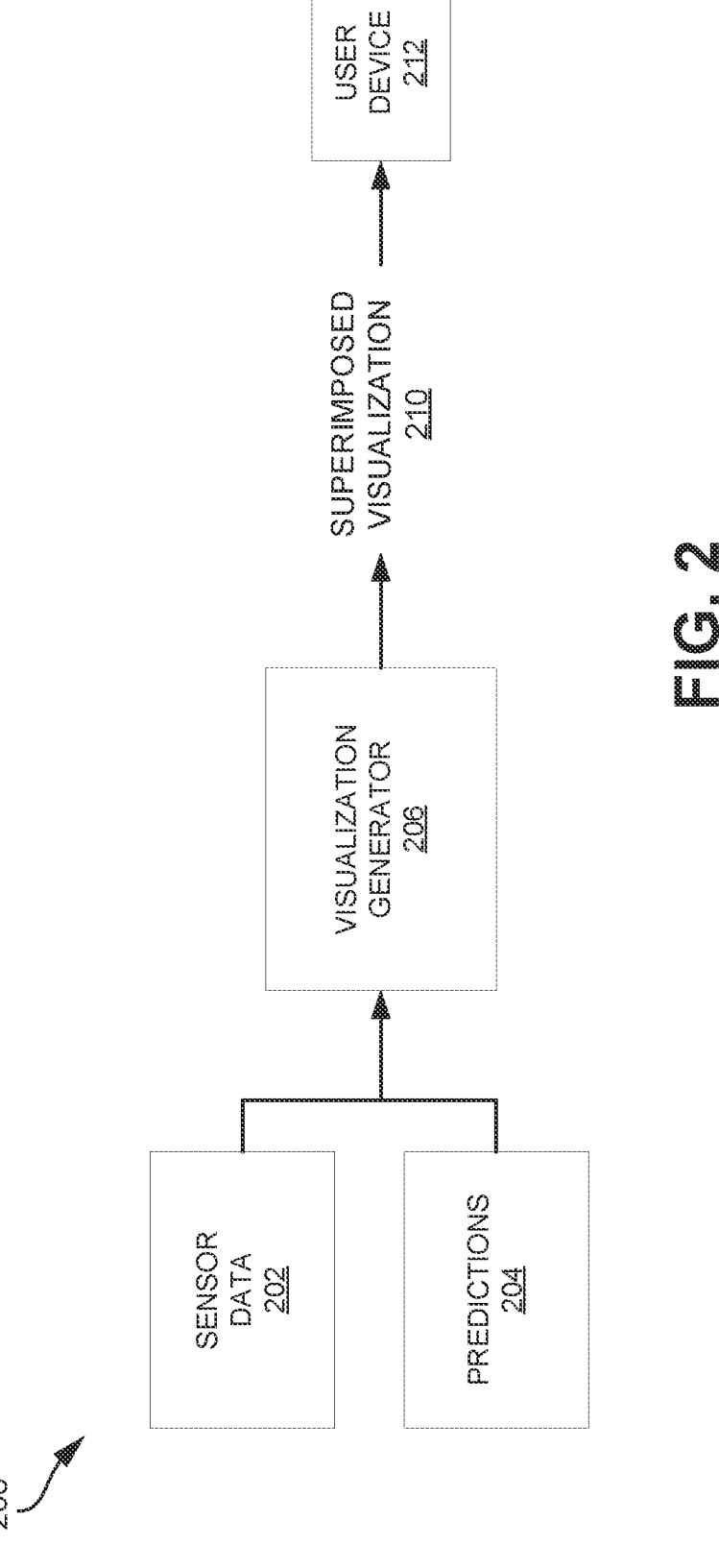
FIG. 2 illustrates an example system for generating a visualization of a driving scene overlaid with predictions, according to some examples of the present disclosure.

FIG. 2 illustrates a block diagram of an example system 200 that can be used to generate a visualization of a driving scene overlaid with predictions. In some aspects, system 200 may include sensor data 202 collected by one or more sensors (e.g., sensor systems 104-108) of AV 102 as illustrated in FIG. 1. For instance, sensor data 202 can include camera data, LIDAR data, RADAR data, ultrasonic data, time-of-flight data, gyroscope data, accelerometer data, steering wheel sensor data, etc. corresponding to a scene or environment in which an AV (e.g., AV 102) navigates.

In some examples, system 200 may include AV data (not shown) received from AV 102. The AV data can include, for example and without limitation, log data from AV 102, perception data from AV 102, status information from AV 102, map data, planning data, data from one or more software stacks (e.g., perception stack, planning stack, control stack, communications stack, localization stack, etc.) of AV 102, and/or any other data associated with AV 102.

In some aspects, system 200 may include environmental data (not shown) that may be received from a local computing device 110 of AV 102 or a remote computing device. The environmental data can include, for example and without limitation, traffic data, weather data, historical road data, map data, etc. that may be associated with the driving scene, in which an AV (e.g., AV 102) navigates.

Based on a variety of data (e.g., sensor data 202, AV data, environmental data, etc.), system 200 can generate a map view of the scene comprising AV 102 and one or more objects (static or dynamic) in the scene. In some cases, the integration of a variety of data can improve the accuracy of a comprehensive visualization of the driving scene in real time.

In some examples, system 200 may include predictions 204 (e.g., motion predictions or behavior predictions of one or more objects that are present in the scene). For example, predictions 204 can be generated based on sensor data 202, AV data, and/or environmental data that are available to system 200. In another example, predictions 204 can be received from prediction stack 116 of AV 102. For example, prediction stack 116 within AV 102 can generate predictions of external actors (e.g., predictions 204 associated with one or more objects in the scene) based on sensor data 202 and internal models. An input to an internal model for generating predictions 204 can include, for example and without limitations, a type of object, pose, kinematics, and/or other actors in the environment. The output of the internal model can include expected/predicted pose and kinematics of an object at a future time (e.g., t+Δt).

In some configurations, predictions 204 may include paths that an object is predicted to take along and a probability associated with each path. For example, predictions 204 can include, for each predicted path, a range of points along the path corresponding to a predicted location of the object along the path at future time intervals and an expected error value for each of the points that indicates a probabilistic deviation from that point.

In some aspects, system 200 can include a visualization generator 206, which is configured to generate superimposed visualization 210 based on sensor data 202, predictions 204, AV data, environmental data, any other data source or type, and/or any combination thereof. For example, visualization generator 206 can create a visual representation of the scene that includes a real-time layer depicting a current status of the scene in real time and a prediction layer depicting what is predicted to happen in the scene (e.g., by one or more ML models of the AV from AI/ML platform 154 as illustrated in FIG. 1). That is, superimposed visualization 210 can provide a comprehensive representation, within a single view, a layout and relationships (or interactions) between AV 102 and objects in the scene, not only in real time but also what is predicted in the future time.

In some approaches, superimposed visualization 210 can be provided to user device 212 for display. For example, superimposed visualization 210 can be displayed within an interactive UI that is associated with AV 102. The user device 212 can include, for example and without limitation, client computing device 170, a remote assistance platform 158 or remote assistance system that includes remote assistance UI, cabin system 138 that includes client interfaces. As follows, a user can interact with UI that displays superimposed visualization 210 to analyze data presented in UI (e.g., compare the discrepancies between what has happened and what was predicted or discrepancies between what is happening in real time and what is predicted in the future time, etc.).

Figure 3:
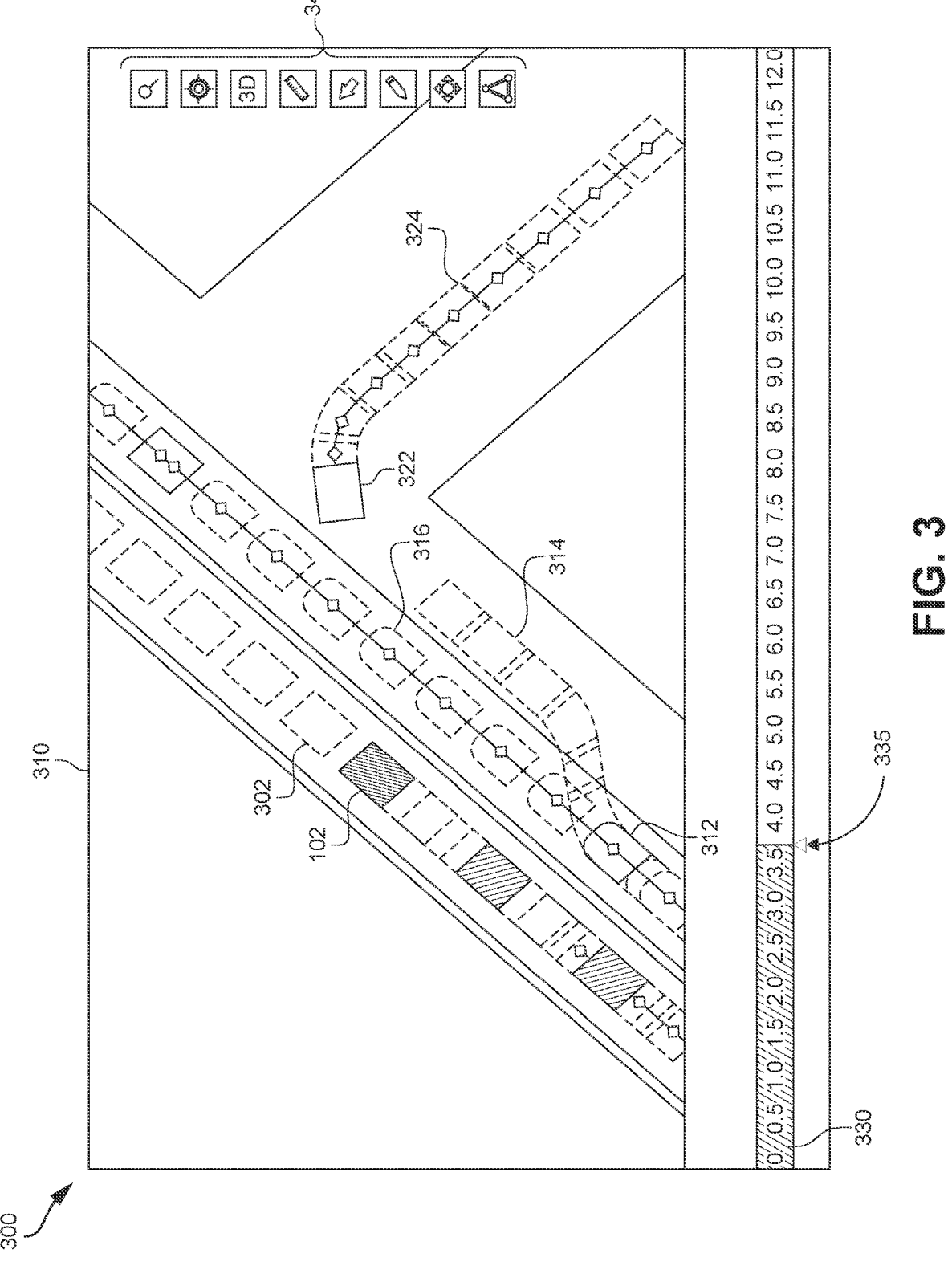
FIG. 3 illustrates an example user interface for displaying a visualization of a driving scene overlaid with predictions, according to some examples of the present disclosure.

FIG. 3 illustrates an example user interface (UI) 300 that displays a visualization 310 of a driving scene overlaid with predictions (e.g., a combination of a real-time layer and a prediction layer). For example, visualization generator 206 can generate visualization 310 (similar to superimposed visualization 210 as illustrated in FIG. 2), which may be displayed via a user device 212 associated with AV 102.

As shown, UI 300 can include visualization 310 comprising a graphical/visual representation of the scene and AV 102 in real-time. For example, visualization 310 can include a visual representation of the position and location of AV 102 and visual representations of road features and scene features (e.g., moving objects such as pedestrians, vehicles, bicycles, etc., static objects such as trees, buildings, etc., lane lines, road signs, traffic lights, and so on) overlaid on a map. In some examples, visualization 310 can include planned path 302 of AV 102. As AV 102 navigates in the scene, visualization 310 can show whether AV 102 is following planned path 302 or deviates from planned path 302.

In some aspects, visualization 310 can include predicted trajectories of objects in the scene overlaid on the map. For example, visualization 310 can include predicted trajectories 314, 316 of vehicle 312 and a predicted trajectory 324 of vehicle 322. In some examples, an object can have multiple predicted trajectories, and therefore, visualization 310 can include multiple predicted trajectories 314, 316 of vehicle 312.

In some aspects, predicted trajectories 314, 316, 324 can include information associated with the predictions such as a confidence level, a probability, a cost relating to safety metrics of the AV for the predictions and so on. For example, each prediction of predicted trajectories 314, 316, 324 can be accompanied by a box that includes data that describes or gives information about the predictions. For example, predicted trajectory 314 of vehicle 312 and predicted trajectory 316 of vehicle 312 may be associated with different confidence levels, probabilities, or costs relating to safety metrics that have resulted in multiple predicted trajectories for vehicle 312. As such, each trajectory (e.g., predicted trajectories 314, 316) can be accompanied by a box (not shown in FIG. 3) that describes the information associated with the predictions such as a confidence level, a probability, a cost relating to safety metrics, etc.

In some examples, UI 300 can include a time slider 330 with a scrubber 335 to navigate the prediction(s) associated with the objects along a timeline within the scene. For example, a user may, via UI 300, play forward and reverse, pause, stop, to view the scene at different points in time, which allows the user to have a temporal understanding of the scene and/or a behavior of AV 102 and other actors present in the scene.

Since visualization 310 can include multiple layers depicting the real-time perception data and predictions (e.g., behaviors that are predicted in the future time), a user may easily and immediately observe and analyze the scene. For example, in some configurations, visualization 310 can be used to analyze the discrepancies between what has happened and what was predicted or discrepancies between what is happening in real time and what is predicted in the future time, and so on.

In some cases, via time slider 330 and/or scrubber 335, a user may control the playback position of the scene. For example, a user may change a current playback position (e.g., at time t) by moving or sliding scrubber 335 (e.g., an indicator, a pointer, etc.) along time slider 330 to a new playback position (e.g., at time t+x) to look into future predictions. In another example, a user may replay what has happened in the past in the scene by moving or sliding scrubber 335 from a current playback position (e.g., at time t) to a new playback position (e.g., at time t−x).

In some aspects, time slider 330 and/or scrubber 335 allow a user to adjust both or either the current playback position and/or a future prediction independently. For example, time $t_a$ may set the world time for where AV 102 physically was at time $t_a$ and the state of the prediction metadata at that time. Also, time to may set the prediction time offset from time $t_a$ for where AV 102 and other objects (e.g., vehicle 312, vehicle 322, etc.) in the scene are predicted to be at time $t_b$ from the perspective of AV 102 at time $t_a$. As such, visualization 310 may show actual path(s) that are taken by other objects in the scene (e.g., vehicle 312, vehicle 322, etc.) in comparison to predicted trajectories of those objects (e.g., predicted trajectories 312, 314, 322, etc.). In some cases, any discrepancy between the actual paths(s) that are taken by other objects and their predicted trajectories can be highlighted or flagged in visualization 310 at any time designated by scrubber 335 on time slider 330 along the timeline while the entire prediction path may be plotted. For example, such discrepancies can be highlighted within visualization 310 in a different color or in a different shape such that a user can easily recognize the difference.

In some approaches, visualization 310 can represent discrepancies the current/real time perception data and predictions such as discrepancies between what is observed in real time and predicted behaviors of objects (e.g., predicted trajectories 314, 316 of vehicle 312 and a predicted trajectory 324 of vehicle 322) or planned path of AV 102). Further, visualization 310 can include the discrepancies that are highlighted or flagged such that the discrepancies can be easily noted by a user. For example, such discrepancies can be highlighted within visualization 310 in a different color or in a different shape such that a user can easily recognize the difference.

In some cases, UI 300 can include user-selectable interface elements 340 that allow a user to provide inputs for interacting with UI 300 and AV 102. The interface elements 340 can include, for example and without limitation, a mute button, a volume control, a play speed, a control menu, a mode, zoom in/out, edit tools, AV control and/or interaction tools, a distance measuring tool, a temporal measuring tool, and so on. For example, user-selectable interface elements 340 may include a button that allows a user to recolor, tint, desaturate, shift/adjust hue shift for certain area(s), path(s), prediction(s), and so on.

Figure 4:
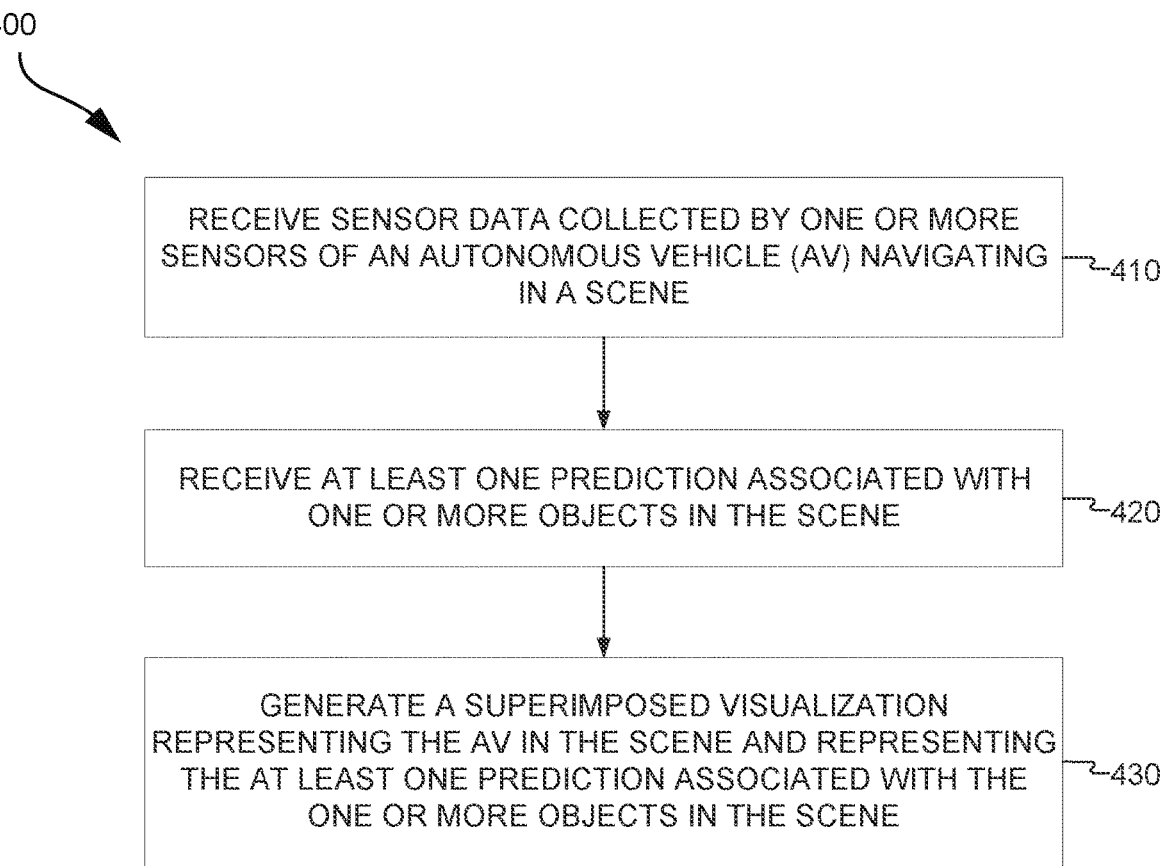
FIG. 4 illustrates a flowchart of an example process of providing a visualization of a driving scene overlaid with predictions, according to some examples of the present disclosure.

FIG. 4 is a flowchart illustrating an example process 400 for visualizing a driving scene overlaid with predictions. Although the example process 400 depicts a particular sequence of operations, the sequence may be altered without departing from the scope of the present disclosure. For example, some of the operations depicted may be performed in parallel or in a different sequence that does not materially affect the function of process 400. In other examples, different components of an example device or system that implements process 400 may perform functions at substantially the same time or in a specific sequence.

At block 410, process 400 includes receiving sensor data collected by one or more sensors of an autonomous vehicle (AV) navigating in a scene. For example, visualization generator 206 can receive sensor data 202 collected by various sensors of AV 102 (e.g., sensor systems 104-108) navigating a scene. The sensor data 202 can include, for example and without limitation, camera data, LIDAR data, RADAR data, ultrasonic data, time-of-flight data, gyroscope data, accelerometer data, steering wheel sensor data, etc. corresponding to a scene or environment in which an AV navigates.

In some cases, visualization generator 206 can receive a variety of data, which may include AV log data, AV perception data, AV status information, map data, planning data, data from software stacks (e.g., perception stack, planning stack, control stack, communications stacks, etc.) of AV 102, traffic data, weather data, historical road data, etc. that can be used in generating a visual representation of the scene in real-time. As follows, based on the variety of data (e.g., sensor data, AV data, environmental data, etc.) that is received, visualization generator 206 can generate a visual map of the driving scene including the AV and various actors (e.g., static or dynamic objects) in the scene.

At block 420, process 400 includes receiving at least one prediction associated with one or more objects in the scene. For example, visualization generator 206 can receive prediction(s) 204 associated with objects that are present in the scene (e.g., predicted trajectories 312, 314 of vehicle 312, predicted trajectory 324 of vehicle 322 as illustrated in FIG. 3). As follows, visualization generator 206 can generate a visual representation depicting the predicted behaviors of objects that are present in the scene.

At block 430, process 400 includes generating a superimposed visualization representing the AV in the scene and representing the at least one prediction associated with the one or more objects in the scene. For example, visualization generator 206 can generate superimposed visualization 210 representing AV 102 in the scene and representing prediction(s) 204 associated with objects in the scene such that a map view of the scene in real-time is overlaid with predictions or predicted trajectories or behaviors of object(s) in the scene.

In some examples, process 400 can include providing the superimposed visualization of the scene and the AV within an interactive UI associated with the AV. For example, visualization generator 206 can provide superimposed visualization 210 of the scene and AV 102 within an interactive UI (e.g., UI 300) associated with AV 102.

In some examples, the superimposed visualization may dynamically display the at least one prediction associated with the one or more objects in time sequence as the AV navigates in the scene as shown in example UI 300. For example, visualization 310 can include what AV 102 has observed (e.g., at time t-x) and what AV 102 is observing (e.g., at time t) as AV 102 navigates in the scene. That is, visualization 310 can have recorded data of what AV 102 has observed such that a user may, via UI 300, replay what has happened in the scene in comparison to what was predicted for the past time and what is predicted for the future time.

In some cases, the superimposed visualization includes a time slider with a scrubber (e.g., an indicator, a pointer, etc.) to navigate the at least one prediction associated with the one or more objects along a timeline within the scene. For example, UI 300 can include a time slider 330 with a scrubber 335 to navigate the prediction(s) associated with the objects along a timeline within the scene. For example, a user may, via UI 300, play forward and reverse, pause, stop, to view the scene at different points in time by moving or sliding scrubber 335 along time slider 330. As follows, a user can have a temporal understanding of the scene and/or a behavior of AV 102 and other actors present in the scene.

In some examples, the superimposed visualization can include a visual data representation that provides information associated with the predictions such as a confidence level of the at least one prediction associated with the one or more objects in the scene, a probability of the at least one prediction associated with the one or more objects in the scene, a cost relating to safety metrics of the AV for the at least one prediction associated with the one or more objects in the scene, etc.

Figure 5:
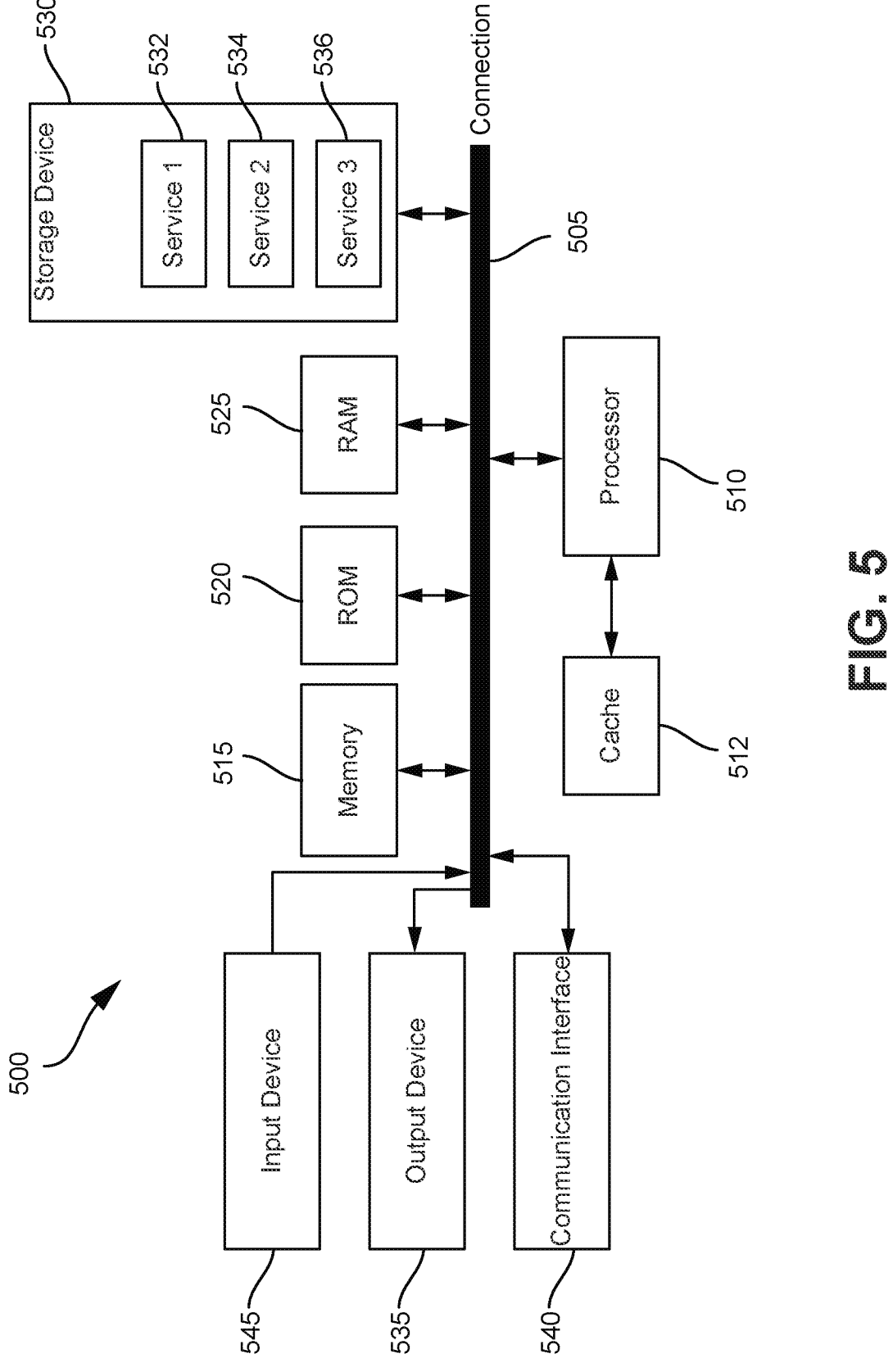
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up local computing device 110, client computing device 170, a passenger device executing the ride-hailing application 172, visualization generator 206, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some examples, computing system 500 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 500 includes at least one processing unit (Central Processing Unit (CPU) or processor) 510 and connection 505 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500.

Computing system 500 can include communication interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., that when the code that defines such software is executed by the processor 510, it causes the system 500 to perform a function. In some examples, a hardware service that performs a particular function can include the software component stored in a computer-readable medium in connection with the necessary hardware components, such as processor 510, connection 505, output device 535, etc., to carry out the function.

Examples within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: a memory; and one or more processors coupled to the memory, the one or more processors being configured to: receive sensor data collected by one or more sensors of an autonomous vehicle (AV) navigating in a scene; receive at least one prediction associated with one or more objects in the scene; and generate a superimposed visualization representing the AV in the scene and representing the at least one prediction associated with the one or more objects in the scene, wherein the superimposed visualization dynamically displays the at least one prediction associated with the one or more objects in time sequence as the AV navigates in the scene.

Aspect 2. The system of Aspect 1, wherein the superimposed visualization includes a time slider with a scrubber to navigate the at least one prediction associated with the one or more objects along a timeline within the scene.

Aspect 3. The system of Aspects 1 or 2, wherein the one or more processors are configured to: identify one or more discrepancies between the at least one prediction associated with the one or more objects in the scene and a behavior of the one or more objects detected in the sensor data; and highlight the one or more discrepancies on the superimposed visualization.

Aspect 4. The system of any of Aspects 1 to 3, wherein the superimposed visualization includes a visual representation of a confidence level of the at least one prediction associated with the one or more objects in the scene.

Aspect 5. The system of any of Aspects 1 to 4, wherein the superimposed visualization includes a visual representation of a cost relating to safety metrics of the AV for the at least one prediction associated with the one or more objects in the scene.

Aspect 6. The system of any of Aspects 1 to 5, wherein the at least one prediction comprises one or more predicted paths of the one or more objects with respect to the AV in the scene.

Aspect 7. The system of any of Aspects 1 to 6, wherein the one or more processors are configured to: provide the superimposed visualization of the scene and the AV within an interactive user interface associated with the AV.

Aspect 8. A method comprising: receiving sensor data collected by one or more sensors of an autonomous vehicle (AV) navigating in a scene; receiving at least one prediction associated with one or more objects in the scene; and generating a superimposed visualization representing the AV in the scene and representing the at least one prediction associated with the one or more objects in the scene, wherein the superimposed visualization dynamically displays the at least one prediction associated with the one or more objects in time sequence as the AV navigates in the scene.

Aspect 9. The method of Aspect 8, wherein the superimposed visualization includes a time slider with a scrubber to navigate the at least one prediction associated with the one or more objects along a timeline within the scene.

Aspect 10. The method of Aspects 8 or 9, further comprising: identifying one or more discrepancies between the at least one prediction associated with the one or more objects in the scene and a behavior of the one or more objects detected in the sensor data; and highlighting the one or more discrepancies on the superimposed visualization.

Aspect 11. The method of any of Aspects 8 to 10, wherein the superimposed visualization includes a visual representation of a confidence level of the at least one prediction associated with the one or more objects in the scene.

Aspect 12. The method of any of Aspects 8 to 11, wherein the superimposed visualization includes a visual representation of a cost relating to safety metrics of the AV for the at least one prediction associated with the one or more objects in the scene.

Aspect 13. The method of any of Aspects 8 to 12, wherein the at least one prediction comprises one or more predicted paths of the one or more objects with respect to the AV in the scene.

Aspect 14. The method of any of Aspects 8 to 13, further comprising: providing the superimposed visualization of the scene and the AV within an interactive user interface associated with the AV.

Aspect 15. A non-transitory computer-readable medium having stored thereon instructions which, when executed by one or more processors, cause the one or more processors to perform a method according to any of Aspects 8 to 15.

Aspect 16. A system comprising means for performing a method according to any of Aspects 8 to 15.

Aspect 17. The system of Aspect 16, wherein the system comprises an autonomous vehicle.

Aspect 18. A computer-program product including instructions which, when executed by one or more processors, cause the one or more processors to perform a method according to any of Aspects 8 to 15.

What is claimed is:

1. A system comprising:
a memory; and
one or more processors coupled to the memory, the one or more processors being configured to:

receive sensor data collected by one or more sensors of an autonomous vehicle (AV) navigating in a scene;
receive at least one prediction associated with one or more objects in the scene; and
generate a superimposed visualization representing the AV in the scene and representing the at least one prediction associated with the one or more objects in the scene, wherein the superimposed visualization dynamically displays the at least one prediction associated with the one or more objects in time sequence as the AV navigates in the scene, and wherein the superimposed visualization is controllable to display the at least one prediction for a selected future time offset relative to a selected vehicle time.

2. The system of claim 1, wherein the superimposed visualization includes a time slider with a scrubber to navigate the at least one prediction associated with the one or more objects along a timeline within the scene.

3. The system of claim 1, wherein the one or more processors are configured to:
identify one or more discrepancies between the at least one prediction associated with the one or more objects in the scene and a behavior of the one or more objects detected in the sensor data; and
highlight the one or more discrepancies on the superimposed visualization.

4. The system of claim 1, wherein the superimposed visualization includes a visual representation of a confidence level of the at least one prediction associated with the one or more objects in the scene.

5. The system of claim 1, wherein the superimposed visualization includes a visual representation of a cost relating to safety metrics of the AV for the at least one prediction associated with the one or more objects in the scene.

6. The system of claim 1, wherein the at least one prediction comprises one or more predicted paths of the one or more objects with respect to the AV in the scene.

7. The system of claim 1, wherein the one or more processors are configured to:
provide the superimposed visualization of the scene and the AV within an interactive user interface associated with the AV.

8. A method comprising:
receiving sensor data collected by one or more sensors of an autonomous vehicle (AV) navigating in a scene;
receiving at least one prediction associated with one or more objects in the scene; and
generating a superimposed visualization representing the AV in the scene and representing the at least one prediction associated with the one or more objects in the scene, wherein the superimposed visualization dynamically displays the at least one prediction associated with the one or more objects in time sequence as the AV navigates in the scene, and wherein the superimposed visualization is controllable to display the at least one prediction for a selected future time offset relative to a selected vehicle time.

9. The method of claim 8, wherein the superimposed visualization includes a time slider with a scrubber to navigate the at least one prediction associated with the one or more objects along a timeline within the scene.

10. The method of claim 8, further comprising:
identifying one or more discrepancies between the at least one prediction associated with the one or more objects in the scene and a behavior of the one or more objects detected in the sensor data; and highlighting the one or more discrepancies on the superimposed visualization.

11. The method of claim 8, wherein the superimposed visualization includes a visual representation of a confidence level of the at least one prediction associated with the one or more objects in the scene.

12. The method of claim 8, wherein the superimposed visualization includes a visual representation of a cost relating to safety metrics of the AV for the at least one prediction associated with the one or more objects in the scene.

13. The method of claim 8, wherein the at least one prediction comprises one or more predicted paths of the one or more objects with respect to the AV in the scene.

14. The method of claim 8, further comprising:

providing the superimposed visualization of the scene and the AV within an interactive user interface associated with the AV.

15. A non-transitory computer-readable medium having stored thereon instructions which, when executed by one or more processors, cause the one or more processors to:

receive sensor data collected by one or more sensors of an autonomous vehicle (AV) navigating in a scene;

receive at least one prediction associated with one or more objects in the scene; and generate a superimposed visualization representing the AV in the scene and representing the at least one prediction associated with the one or more objects in the scene, wherein the superimposed visualization dynamically displays the at least one prediction associated with the one or more objects in time sequence as the AV navigates in the scene, and wherein the superimposed visualization is controllable to display the at least one prediction for a selected future time offset relative to a selected vehicle time.

16. The non-transitory computer-readable medium of claim 15, wherein the superimposed visualization includes a time slider with a scrubber to navigate the at least one prediction associated with the one or more objects along a timeline within the scene.

17. The non-transitory computer-readable medium of claim 15, wherein the one or more processors are configured to:

identify one or more discrepancies between the at least one prediction associated with the one or more objects in the scene and a behavior of the one or more objects detected in the sensor data; and highlight the one or more discrepancies on the superimposed visualization.

18. The non-transitory computer-readable medium of claim 15, wherein the superimposed visualization includes a visual representation of a confidence level of the at least one prediction associated with the one or more objects in the scene.

19. The non-transitory computer-readable medium of claim 15, wherein the superimposed visualization includes a visual representation of a cost relating to safety metrics of the AV for the at least one prediction associated with the one or more objects in the scene.

20. The non-transitory computer-readable medium of claim 15, wherein the at least one prediction comprises one or more predicted paths of the one or more objects with respect to the AV in the scene.

* * * * *